(12) United States Patent
Kimura

(10) Patent No.: US 9,043,655 B2
(45) Date of Patent: May 26, 2015

(54) APPARATUS AND CONTROL METHOD

(71) Applicant: FUJITSU LIMITED, Kawasaki-shi, Kanagawa (JP)

(72) Inventor: Takahiko Kimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 211 days.

(21) Appl. No.: 13/929,216

(22) Filed: Jun. 27, 2013

(65) Prior Publication Data

US 2014/0006880 A1  Jan. 2, 2014

(30) Foreign Application Priority Data

Jun. 29, 2012  (JP) ................................ 2012-147889

(51) Int. Cl.
  *G06F 11/08*  (2006.01)
  *G06F 11/10*  (2006.01)
(52) U.S. Cl.
  CPC ............ *G06F 11/08* (2013.01); *G06F 11/1008* (2013.01)
(58) Field of Classification Search
  CPC . G06F 11/08; G06F 11/1008; G06F 11/1048; G06F 11/141; G06F 11/1666; G06F 11/167; G06F 11/1068; G06F 11/1629; G06F 11/1658; G06F 11/2028; G06F 11/2038; G06F 13/1684; G06F 13/426
  See application file for complete search history.

(56) References Cited

U.S. PATENT DOCUMENTS

| | | | | |
|---|---|---|---|---|
| 7,308,605 | B2 * | 12/2007 | Jardine et al. | 714/11 |
| 7,467,261 | B2 * | 12/2008 | Ueki et al. | 711/131 |
| 2006/0020850 | A1 * | 1/2006 | Jardine et al. | 714/11 |
| 2010/0325522 | A1 * | 12/2010 | Tsukamoto et al. | 714/770 |
| 2011/0047440 | A1 * | 2/2011 | Blackmon et al. | 714/764 |
| 2012/0084628 | A1 * | 4/2012 | Cox et al. | 714/763 |
| 2012/0096310 | A1 * | 4/2012 | Varanasi et al. | 714/15 |

FOREIGN PATENT DOCUMENTS

| | | |
|---|---|---|
| JP | 57-105900 | 1/1982 |
| JP | 2010-102640 | 5/2010 |

* cited by examiner

*Primary Examiner* — Nadeem Iqbal
(74) *Attorney, Agent, or Firm* — Staas & Halsey LLP

(57) ABSTRACT

An apparatus includes a first memory, a second memory, a processor configured to perform an initialization process including adding data that generates a first error to initialization data and storing the initialization data together with the added data in the first memory to initialize the first memory, and a controller configured to perform an exchanging process including, when a second error occurs in the second memory during reading or writing data from or to the second memory, copying the data stored in the second memory into the first memory and switching, using a selector, a memory for use in writing and reading data from the second memory to the first memory. The processor is configured to read data from the first memory and the second memory and detect a failure of the selector or a failure of the exchanging process depending on whether the first error occurs or not.

14 Claims, 9 Drawing Sheets

FIG. 3A

| DATA (128 BITS) | ECC (16 BITS) | SYMPTOM CODE |
|---|---|---|
| 411 — 0000000000000000 0000000000000000 | 0F0F | 0F0F — 413 |
| 414 — 105F012303200010 101110F0C9088800 | AD8E | 0F0F — 416 |

| DATA (128 BITS) | ECC (16 BITS) | SYMPTOM CODE |
|---|---|---|
| 421 — 0000000000000000 0000000000000000 | 6E9D | 6E9D — 423 |
| 424 — 105F012303200010 101110F0C9088800 | CC1C | 6E9D — 426 |

| STATUS | | ACCESSED RANK | ERROR TYPE | SYMPTOM CODE | LOCATION OF FAULT | DESCRIPTION OF ERROR | |
|---|---|---|---|---|---|---|---|
| BEFORE EXCHANGE | | PRIMARY | 1RAM | ERROR CODE INDICATING 1RAM ERROR | DIMM | ORDINARY ERROR OF 1RAM | ~501 |
| | | AUXILIARY | | JUDGMENT ERROR CODE | SWITCHING MECHANISM | FAILURE OF SWITCHING CIRCUIT | ~502 |
| | | PRIMARY | 2RAM OR MORE | ERROR CODE INDICATING ERROR OF 2RAM OR MORE OTHER THAN JUDGMENT ERROR CODE | DIMM | ORDINARY ERROR OF 2RAM OR MORE | ~503 |
| | | | | JUDGMENT ERROR CODE | - | EXPECTED ERROR | ~504 |
| | | AUXILIARY | | ERROR CODE INDICATING ERROR OF 2RAM OR MORE OTHER THAN JUDGMENT ERROR CODE | SWITCHING MECHANISM | ORDINARY ERROR OF 2RAM OR MORE (EXCHANGING IS DISABLED) | ~505 |
| AFTER EXCHANGE | | AUXILIARY | 1RAM | ERROR CODE INDICATING 1RAM ERROR | DIMM | ORDINARY ERROR OF 1RAM | ~506 |
| | | | | JUDGMENT ERROR CODE | SWITCHING MECHANISM | FAILURE OF EXCHANGING PROCESS | ~507 |
| | | AUXILIARY | 2RAM OR MORE | ERROR CODE INDICATING ERROR OF 2RAM OR MORE OTHER THAN JUDGMENT ERROR CODE | DIMM | ORDINARY ERROR OF 2RAM OR MORE | ~508 |

APPARATUS AND CONTROL METHOD

CROSS-REFERENCE TO RELATED APPLICATION

This application is based upon and claims the benefit of priority of the prior Japanese Patent Application No. 2012-147889, filed on Jun. 29, 2012, the entire contents of which are incorporated herein by reference.

FIELD

The embodiments discussed herein are related to an apparatus and a control method.

BACKGROUND

In recent years, use of electronic apparatuses has grown, and places where electronic apparatuses to perform complicated high-level processes are increasing. An information processing apparatus is an example of such an electronic apparatus. When an electronic apparatus is performing an important process, it is desirable to avoid having the process halt partway through. Thus there is a demand for electronic apparatuses with high availability that are capable of avoiding a fault or quickly recovering from a fault when the fault occurs. In some electronic apparatuses from which high availability is desired, a dual in-line memory module (DIMM) is used.

DIMMs include synchronous dynamic random access memory (SDRAM ICs) integrated circuits (IC). However, a SDRAM IC may have a high failure occurrence rate. Therefore, if a DIMM is used without protection for data, the data stored in the DIMM may become corrupted, which may significantly affect processes performed by electronic apparatuses. In response, techniques of using DIMMs having an error-correcting code (ECC) functionality that detects and corrects errors, allows the availability of electronic apparatuses to be enhanced. Specifically, writing data into a DIMM with an ECC makes it possible to correct an error. More specifically, when a failure occurs in an SDRAM IC and data stored in the DIMM is corrupted, if the failure is limited to only one SDRAM IC, it is possible to correct the error, which allows operations to continue. However, when the apparatus is being operated in a state in which one SDRAM IC is already corrupted and the apparatus operates after performing error correction, if a further failure occurs in another SDRAM IC, the further failure results in an unrecoverable corruption of the DIMM.

In the ECC function, a check bit is produced from data according to a particular formula, and the check bit is written as an ECC together with the data. When the data is read, a symptom code is generated by recalculating the check bit for the read data. The symptom code is position information identifying an error position. That is, use of the symptom code makes it possible to identify the location of a corrupted bit in the DIMM. In a DIMM having an ECC function, if an error occurs only in one SDRAM IC, an error position is identified, but if errors occur in two or more SDRAM ICs, error positions are not identified although an occurrence of errors is detected. By using a greater number of check bits, it may become possible to identify error positions in a plurality of SDRAM ICs. However, increasing the number of check bits results in insufficiency of the bit width available in one DIMM. Thus, to make it possible to handle errors in a plurality of SDRAM ICs, a plurality of DIMMs may be used to increase the number of bits for each ECC.

There is a technique wherein an auxiliary SDRAM IC is disposed in a DIMM such that when an error is detected in an SDRAM IC, data is moved from the SDRAM IC where the error occurred into the auxiliary SDRAM IC thereby allowing operations to continue by using the auxiliary SDRAM IC. With a DIMM that uses this technique, it becomes possible to handle up to two errors if the errors occur in a single SDRAM IC. However, when an auxiliary SDRAM IC is being used, if a further error occurs in another SDRAM IC, the system may go into a vulnerable state. Therefore, use of an auxiliary SDRAM IC is a temporary step until the DIMM is exchanged.

Furthermore, use of auxiliary SDRAM IC may result in a DIMM taking up greater space due to physical considerations for the SDRAM IC and interconnections therefor. This makes it difficult for recent electronic apparatuses with a small size to find sufficient space to install a DIMM that includes an auxiliary SDRAM IC. Japanese Laid-open Patent Publication No. 2010-102640 is known as an example of related art. To handle the above problem, the related art discloses a technique in which a DIMM is configured to have two ranks—one for normal use and the other for an auxiliary rank thereby achieving a redundancy. Use of the word "rank" refers to a collection, with respect to a DIMM, that is a memory component. More specifically, a DIMM is usable in units of ranks, and each rank is a unit of access to a DIMM. That is, in a DIMM having a plurality of ranks, reading and writing data may be performed independently for each of rank. In this conventional technique, for example, the rank normally used and the auxiliary rank are initialized by entirely filling with zeros, and a normal ECC is added. When an error occurs in a rank being currently used, data is moved into the auxiliary rank and the operation is continued using the auxiliary rank.

However, in the related art, when a failure occurs in a memory controller or the like, there is a possibility that unpredicted exchange of ranks occurs, and this may cause a problem that even though data is read from the auxiliary rank, no ECC error occurs and the read data is treated as being normal data although the data is actually not intended data. Furthermore, when a copy failure occurs and even though data from before the copy remains in the auxiliary rank, despite use of the auxiliary rank an ECC is unable to detect an error.

SUMMARY

According to an aspect of the invention, an apparatus includes a first memory; a second memory; a processor configured to perform an initialization process to initialize the first memory, the initialization process including adding data that generates a first error to initialization data and storing the initialization data together with the added data in the first memory; and a controller configured to perform an exchanging process including, when a second error occurs in the second memory during reading or writing data from or to the second memory, copying the data stored in the second memory into the first memory and switching, using a selector, a memory for use in writing and reading data from the second memory to the first memory, wherein the processor is configured to perform an error detecting process including reading data from the first memory and the second memory and detecting a failure of the selector or a failure of the exchanging process depending on whether the first error occurs or not.

The object and advantages of the invention will be realized and attained by means of the elements and combinations particularly pointed out in the claims.

BRIEF DESCRIPTION OF DRAWINGS

FIG. 3A is a diagram illustrating a relationship between an ECC and a symptom code in a normal state;

FIG. 3B is a diagram illustrating a relationship between an ECC and a symptom code for when a judgment error code is embedded;

FIG. 8 is a diagram summarizing failures which may be identified by ECC errors by an information processing apparatus according to an embodiment.

DESCRIPTION OF EMBODIMENTS

Embodiments of an electronic apparatus, a method of controlling an electronic apparatus, and a program of controlling an electronic apparatus are described in detail below with reference to drawings. Note that the following description is given by way of example only and the embodiments are not limited to the examples of the electronic apparatus, the method of controlling the electronic apparatus, and the program of controlling the electronic apparatus described below. In particular, although an information processing apparatus serving as a server is taken as an example in the following description, embodiments may also be applied to other electronic apparatuses using memory such as a dual in-line memory module (DIMM).

First Embodiment

Figure 1:
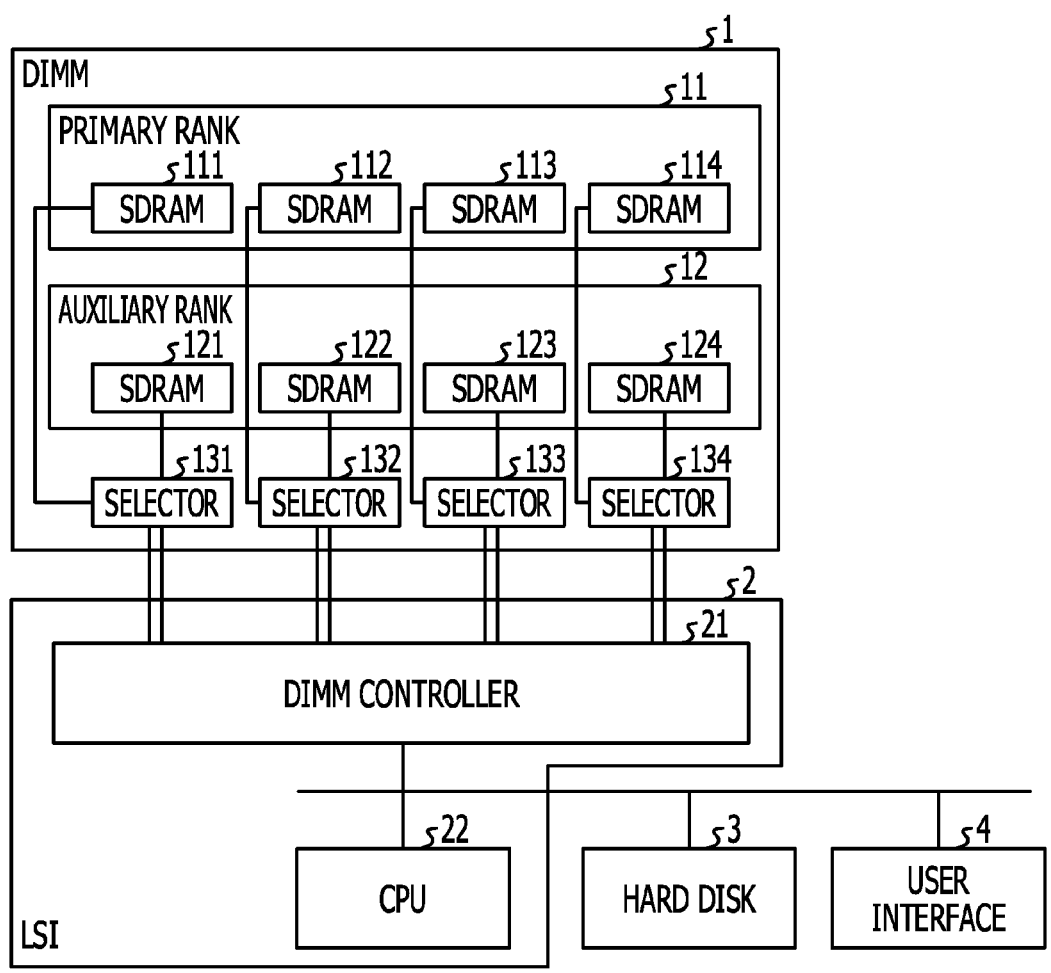
FIG. 1 is a diagram illustrating a hardware configuration of an information processing apparatus according to an embodiment.

FIG. 1 illustrates a hardware configuration of an information processing apparatus according to an embodiment. The information processing apparatus according to the present embodiment is, for example, a server or the like. The information processing apparatus according to the present embodiment includes a DIMM 1, a large-scale integration IC (LSI) 2, a hard disk 3 and a user interface 4.

The LSI 2 includes a central processing unit (CPU) 22, which is an example of a processor, and a DIMM controller 21. The hard disk 3, the user interface 4, and the DIMM controller 21 are connected to the CPU 22 via a bus.

The DIMM 1 is, for example, a dual rank DIMM. The DIMM 1 has two ranks, that is, a primary rank 11 and an auxiliary rank 12. The primary rank 11 and the auxiliary rank 12 are each capable of independently writing and reading data. The primary rank 11 includes synchronous dynamic random access memory ICs (SDRAM ICs) 111, 112, 113 and 114. The auxiliary rank 12 includes SDRAM ICs 121, 122, 123 and 124. In the example illustrated in FIG. 1, the primary rank 11 and the auxiliary rank 12 each have four SDRAM ICs. However there is no particular restriction on the number of SDRAM ICs disposed in each rank as long as the SDRAM ICs are able to be disposed on the DIMM 1. For example, the SDRAM ICs 111 to 114 and the SDRAM ICs 121 to 124 each have a capacity of 4 bits or 8 bits.

The DIMM 1 further includes selectors 131, 132, 133 and 134. The selector 131 is connected to the SDRAM ICs 111 and 121. The selector 131 is also connected to the DIMM controller 21. In FIG. 1, the DIMM controller 21 and the selector 131 are connected to each other via two paths. One of these two paths is a transmission path via which transmit data to write and read into or from the SDRAM IC 111 or 121, and the other path transmits a control signal used to control the selector 131 to select SDRAM IC 111 or 121 to be used as an SDRAM into or from which data is written or read. The selectors 132 to 134 are each configured in a similar manner to the selector 131.

In the information processing apparatus according to the present embodiment, in order to handle failures of a whole SDRAM IC in the DIMM 1, an ECC is used which is configured such that a failed SDRAM IC is identified and such that any bit error in the same SDRAM is correctable. To achieve the capability described above, the DIMM 1 is configured such that two DIMMs are used, and a 16-bit ECC is used to handle 128-bit data.

The hard disk 3 stores various programs and the like. The user interface 4 includes an input device such as a keyboard, a mouse or the like and an output device such as a monitor.

Figure 2:
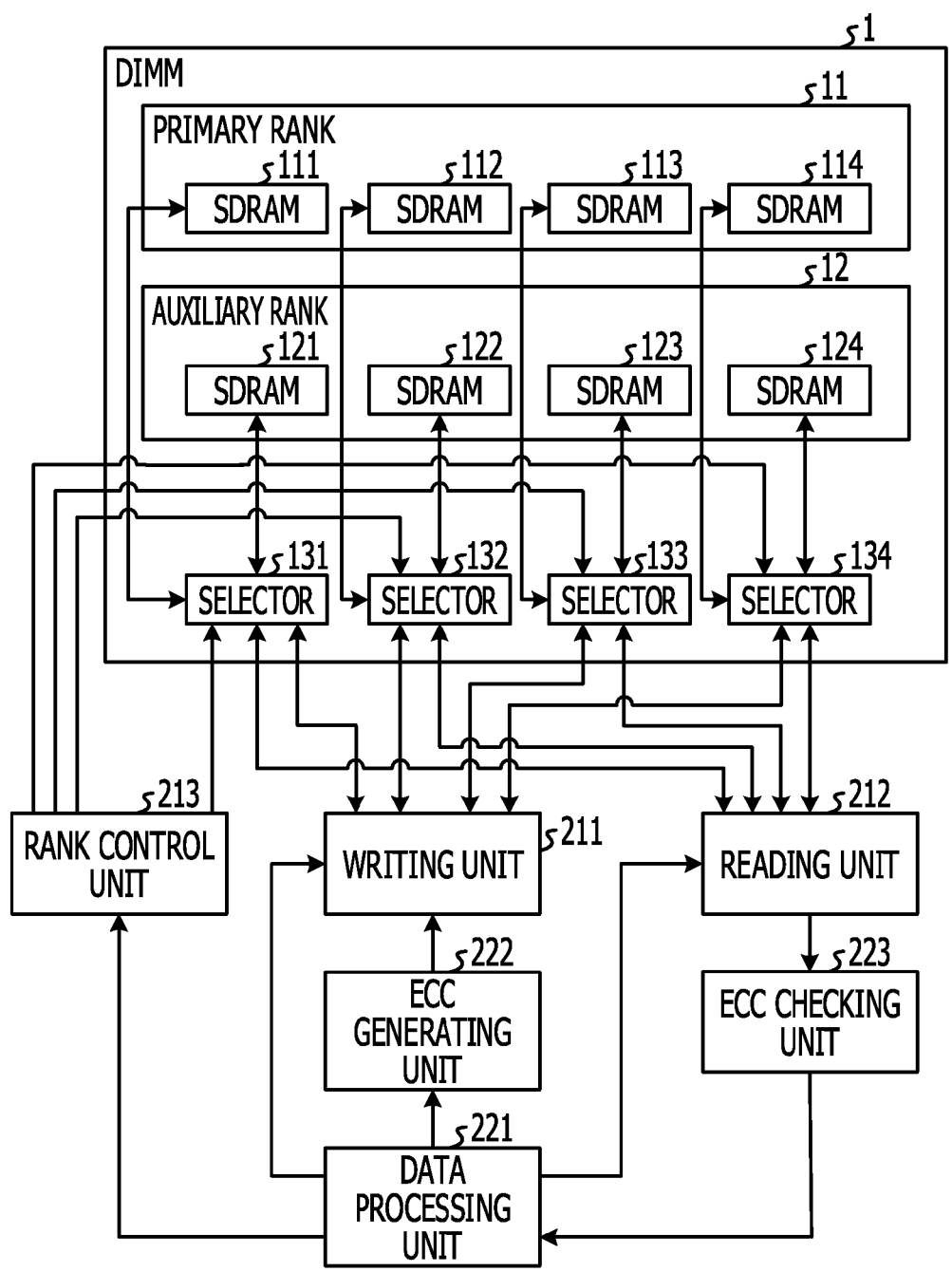
FIG. 2 is a block diagram of an information processing apparatus according to an embodiment.

Next, referring to FIG. 2, functions of each unit are described. FIG. 2 is a block diagram illustrating an information processing apparatus according to the present embodiment. As illustrated in FIG. 2, the information processing apparatus according to the present embodiment includes a DIMM 1, a rank control unit 213, a writing unit 211, a reading unit 212, a data processing unit 221, an ECC generating unit 222, and an ECC checking unit 223.

The DIMM 1 illustrated in FIG. 2 is the same as the DIMM 1 illustrated in FIG. 1. The functions of the writing unit 211, the reading unit 212, and the rank control unit 213 are realized, for example, by the DIMM controller 21 illustrated in FIG. 1. The functions of the data processing unit 221, the ECC generating unit 222, and the ECC checking unit 223 are realized, for example, by the CPU 22 illustrated in FIG. 1.

Data output from the writing unit 211 is written in the SDRAM ICs 111 to 114 and the SDRAM ICs 121 to 124. Data stored in the SDRAM ICs 111 to 114 and the SDRAM ICs 121 to 124 is read by the reading unit 212. In the present embodiment, the primary rank 11 that includes the SDRAM ICs 111 to 114 is a rank used when no failure has occurred. The auxiliary rank 12 that includes the SDRAM ICs 121 to 124 is a rank which is not used when the primary rank 11 is used, but which is used when a failure has occurred in the primary rank 11. Hereinafter, a state in which no failure has occurred in the primary rank 11 will also be referred to as a "normal state". Switching the rank being used from the primary rank 11 to the auxiliary rank 12 when a failure occurs in the primary rank 11 will also be referred to as "rank exchanging". The primary rank 11 is an example of a "second storage unit", and the auxiliary rank 12 is an example of a "first storage unit".

The selector 131 follows a control signal given by the DIMM controller 21 and selects either the primary rank 11 or the auxiliary rank 12 as the rank for use in writing and reading data. The selector 131 transfers the data received from the writing unit 211 to the SDRAM IC 111 or 121 belonging to the selected rank. The selector 131 transfers the data received from the SDRAM IC 111 or 121 belonging to the selected rank to the reading unit 212. The selectors 132 to 134 also operate in a similar manner.

Next, the data processing unit 221 is described below. The data processing unit 221 operates differently depending on whether initialization, failure monitoring, or data processing is performed. In failure monitoring, the data processing unit 221 operates differently before and after the rank exchanging process is performed. Thus, the operation is described below for each situation. Note that in the present embodiment, as described above, the ECC is configured to allow detection of an error for each SDRAM IC and to make a correction when an error occurs only in one SDRAM. In the following description, the number of failed SDRAM ICs is expressed by a numeral described immediately before "RAM". For example, when there is one failed SDRAM IC, the expression "1RAM error" is used.

[Operation in Initialization Process]

To initialize the primary rank 11, the data processing unit 221 transmits an initialization command to the writing unit 211. The initialization command is, for example, a command to write initialization data into the SDRAM ICs 111 to 114 in the primary rank 11. Furthermore, the data processing unit 221 transmits the initialization data to the ECC generating unit 222 and instructs the ECC generating unit 222 to add an ECC. In the present embodiment, for example values of the initialization data is set to 0. However, the initialization data may have other values, and, for example, all values may be equal to "f". Furthermore, the data processing unit 221 transmits a command to the rank control unit 213 to select the primary rank 11.

For initialization of the auxiliary rank 12, the data processing unit 221 transmits an initialization command to the writing unit 211. The initialization command is, for example, a command to write initialization data into the SDRAM ICs 121 to 124 in the auxiliary rank 12. Furthermore, the data processing unit 221 transmits the initialization data to the ECC generating unit 222, and the data processing unit 221 instructs the ECC generating unit 222 to add an ECC to the initialization data such that a predetermined judgment error is generated when error checking using the ECC is performed. The judgment error is an ECC error which is set to detect a failure of the rank exchanging process or a failure of the rank control unit 213 or the selectors 131 to 134. The judgment error is an example of a "first error". Furthermore, the data processing unit 221 transmits an instruction to the rank control unit 213 to select the auxiliary rank 12. Details such as of the process of generating the judgment error will be described later. Hereinafter, a symptom code that is generated for a judgment error is referred to as a "judgment error code". Hereinafter, adding an ECC that generates a judgment error is referred to as embedding a judgment error code.

[Operation in Failure Monitoring Before Rank Exchanging is Performed]

In the state before the rank exchanging is performed, the data processing unit 221 performs the failure monitoring process for both the primary rank 11 and the auxiliary rank 12 in the DIMM 1. For example, the data processing unit 221 performs the failure monitoring promptly after the initialization is performed and then performs the failure monitoring periodically. More specifically, the data processing unit 221 causes the reading unit 212 to read data from the primary rank 11 and the auxiliary rank 12, and the data processing unit 221 causes the ECC checking unit 223 to perform the ECC checking on the data read by the reading unit 212. The data processing unit 221 receives, from the ECC checking unit 223, the read data and a normal notification or an error notification. Hereinafter, the process of detecting an error during failure monitoring will also be referred to as "error checking".

If a normal notification is received from the ECC checking unit 223, the data processing unit 221 proceeds to error-check the next data.

If notification of a 1RAM error in the primary rank 11 has been received from the ECC checking unit 223, the data processing unit 221 uses the ECC to correct the error in the read data. The data processing unit 221 then instructs the writing unit 211 to write the error-corrected data. Thereafter, the data processing unit 221 instructs the reading unit 212 to read the same data. The data processing unit 221 then receives a notification of a result of the ECC checking on the same data from the ECC checking unit 223. If the notification is normal, the data processing unit 221 proceeds to check the next data.

However, if the notification indicates that a 1RAM error has been detected, the data processing unit 221 determines that a permanent error has occurred in the primary rank 11. The data processing unit 221 then corrects the error in the read data. Furthermore, the data processing unit 221 causes the reading unit 212 to read data from the primary rank 11. The data processing unit 221 then instructs the writing unit 211 to write the data read from the primary rank 11 into the auxiliary rank 12. In this case, for data having a 1RAM error, the data processing unit 221 instructs the writing unit 211 to write the error-corrected data instead of the original read data. Hereinafter, an expression "rank exchanging process" will also be used to denote the process that includes reading data from the primary rank 11, writing the read data into the auxiliary rank 12, and changing use of the rank from the primary rank 11 to the auxiliary rank 12. A 1RAM error that causes a rank exchanging process to occur is an example of a "second error".

In the rank exchanging process, the data processing unit 221 instructs the rank control unit 213 to connect to the primary rank 11 when reading but connect to the auxiliary rank 12 when writing. After all data stored in the primary rank 11 has been transferred to the auxiliary rank 12, the data processing unit 221 instructs the rank control unit 213 to connect to the auxiliary rank 12. Thereafter, the data processing unit 221 informs an operator via a user interface 4 (see FIG. 1) that the rank exchanging process has been performed.

When error checking the primary rank 11, if the data processing unit 221 receives a judgment error code from the ECC checking unit 223, the data processing unit 221 determines that a failure has occurred in a rank selection mechanism such as the rank control unit 213 or the selectors 131 to 134. Hereinafter, a rank selection mechanism, which includes the rank control unit 213 and the selectors 131 to 134, will also be referred to as a "switching mechanism". The data processing unit 221 informs an operator via the user interface 4 (see FIG. 1) that a failure has occurred in the switching mechanism.

When error checking the primary rank 11, if the data processing unit 221 receives from the ECC checking unit 223 an error code for a 2RAM error or an error for failure of more than two SDRAM ICs that are not an error and the judgment error code, the data processing unit 221 determines that a failure has occurred in the primary rank 11. The data processing unit 221 then informs an operator via a user interface 4 (see FIG. 1) that a failure in the primary rank 11 of the DIMM 1 has occurred.

When error checking the auxiliary rank 12, if a notification of a 1RAM error is received from the ECC checking unit 223, the data processing unit 221 uses the ECC to rectify the error of the read data. The data processing unit 221 then instructs the writing unit 211 to write the error-corrected data. Thereafter, the data processing unit 221 instructs the reading unit 212 to read the same data. The data processing unit 221 then receives a notification of the result of ECC checking on the newly read data from the ECC checking unit 223. If the notification is normal, then the data processing unit 221 proceeds to check next data. However, if the notification is of a 1RAM error, then the data processing unit 221 determines that a permanent error has occurred in the auxiliary rank 12. The data processing unit 221 then corrects the error of the read data. The data processing unit 221 then informs an operator via the user interface 4 (see FIG. 1) that a permanent error in the auxiliary rank 12 of the DIMM 1 has occurred.

When error checking the auxiliary rank 12, if a judgment error code is received from the ECC checking unit 223, the data processing unit 221 determines that the auxiliary rank 12 is in a normal state. Thus, the data processing unit 221 proceeds to check next data.

When error checking on the auxiliary rank 12, if the data processing unit 221 receives from the ECC checking unit 223 a symptom code indicating that a 2RAM error or an error for a number of SDRAM ICs that are not a judgment error code, the data processing unit 221 determines that a failure has occurred in the auxiliary rank 12. Similarly when a normal notification is received, the data processing unit 221 determines that a failure has occurred in the auxiliary rank 12. In these cases, the data processing unit 221 instructs the rank control unit 213 not to perform the rank exchanging process. Thus the data processing unit 221 informs an operator via the user interface 4 (see FIG. 1) that a failure in the auxiliary rank 12 of the DIMM 1 has occurred.

[Failure Monitoring after Rank Exchanging is Performed]

After the rank exchanging process is performed, the data processing unit 221 periodically performs the failure monitoring process for the auxiliary rank 12 of the DIMM 1. More specifically, the data processing unit 221 causes the reading unit 212 to read data from the auxiliary rank 12 and causes the ECC checking unit 223 to perform ECC checking on the data read by the reading unit 212. The data processing unit 221 receives, from the ECC checking unit 223, the read data and either a normal notification or an error notification.

If the no-error notification is received from the ECC checking unit 223, the data processing unit 221 proceeds to check next data.

When a notification of a 1RAM error is received from the ECC checking unit 223, the data processing unit 221 corrects the error of the read data using the ECC. The data processing unit 221 then instructs the writing unit 211 to write the error-corrected data. Furthermore, the data processing unit 221 instructs the reading unit 212 to read the same data.

Thereafter, the data processing unit 221 receives a notification of the result of ECC checking the same data from the ECC checking unit 223. If the notification indicates that there is no error, then the data processing unit 221 proceeds to check next data. However, if there is notification of a 1RAM error, the data processing unit 221 determines that a permanent error has occurred in the auxiliary rank 12. Then the data processing unit 221 corrects the error of the read data. Thereafter, the data processing unit 221 informs an operator via the user interface 4 (see FIG. 1) that a permanent error in the auxiliary rank 12 has occurred. In response, the operator may, for example, replace the DIMM 1.

If a judgment error code is received from the ECC checking unit 223, the data processing unit 221 determines that the rank exchanging process has failed, and the data processing unit 221 informs an operator via the user interface 4 (see FIG. 1) that the rank exchanging process has failed. In this case, the operator may, for example, replace the LSI 2.

If the data processing unit 221 receives from the ECC checking unit 223 a symptom code indicating an occurrence of a 2RAM error or errors for more than two SDRAM ICs that is not a judgment error code, the data processing unit 221 determines that a failure has occurred in the auxiliary rank 12, and the data processing unit 221 informs an operator via the user interface 4 (see FIG. 1) that the auxiliary rank 12 of the DIMM 1 has failed. In this case, the operator may, for example, replace the DIMM 1.

[Data Processing]

The data processing unit 221 performs data processing by executing an application program or the like. When the data processing is a data writing process, the data processing unit 221 transmits a write command to the writing unit 211. The data processing unit 221 then transmits data to be written to the ECC generating unit 222. When a read process is performed as the data processing, the data processing unit 221 transmits a data read command to the reading unit 212. The data processing unit 221 receives data to be read and a result of ECC checking from the ECC checking unit 223.

If the result of the ECC check indicates a 1RAM error, the data processing unit 221 corrects the data using the ECC and uses the corrected data in the data processing. If the result of the ECC checking indicates an occurrence either a 2RAM error or an error for more than two SDRAM ICs, the data processing unit 221 stops data processing, and then performs the failure monitoring process described above.

When the primary rank 11 is to be initialized, the ECC generating unit 222 receives initialization data from the data processing unit 221. The ECC generating unit 222 generates a normal ECC from the initialization data. The ECC generating unit 222 then outputs to the writing unit 211 the initialization data together with the generated normal ECC added thereto.

FIG. 3A is a diagram illustrating a relationship between an ECC and a symptom code in a normal state. The ECC generating unit 222 receives data 411 as the initialization data whose values are all 0. The ECC generating unit 222 performs a predetermined ECC generation process on the initialization data. As a result, "0F0F" is obtained as the ECC 412. At this point, a symptom code 413 is generated from the data 411 and the ECC 412. The ECC generating unit 222 outputs the data 411 with the ECC 412 added thereto to the writing unit 211.

When the auxiliary rank 12 is to be initialized, the ECC generating unit 222 receives initialization data from the data processing unit 221. From the received initialization data, the ECC generating unit 222 generates a judgment error code, which is an ECC that for causing a judgment error to be generated. It is preferable that errors occur in at least two SDRAM ICs in the same rank. As the judgment errors generate the greater number of SDRAM ICs in the same rank, the easier to distinguish the judgment errors from actual ECC errors. In the present embodiment, the following description, that the situation where a judgment errors occur in four SDRAM ICs, that is, a 3RAM error occurs.

In the present embodiment, the ECC generating unit 222 generates a normal ECC from initialization data, and thereafter inverts predetermined bits in the normal ECC to generate a judgment error code that generates judgment errors. However, the manner of generating the judgment error code is not limited to that described above. For example, after generating a normal ECC, the ECC generating unit 222 may invert predetermined bits of the initialization data so that a judgment error is generated. Alternatively, the ECC generating unit 222 may create an ECC as normal based on inverting predetermined bits in initialization data so that a judgment error occurs and so that a judgment error code is generated, and then the ECC generating unit 222 adds the generated judgment error code to the initialization data.

FIG. 3B is a diagram illustrating the relationship between an ECC and a symptom code when the judgment error code is embedded. For example, in the present embodiment, the ECC generating unit 222 receives, as initialization data, data 421 of which values are all set to, for example, 0. The ECC generating unit 222 then performs a predetermined ECC generation process on the initialization data and obtains "0F0F" as an ECC. The ECC generating unit 222 then inverts predetermined bits of "0F0F" to thereby generate "6E9D" as an ECC 422. More specifically, the second and third bits in a first four-bit group expressing the first value of the ECC and the fourth bit in a second four-bit group expressing the second value of the ECC are inverted. Furthermore, the first last bits in a four-bit group expressing the third value of the ECC and the third bit in a four-bit group expressing the last value of the ECC are inverted. In this case, the judgment error code, that is, the symptom code 423 generated from the data 421 and the ECC 422 is given as "6E9D". The ECC generating unit 222 adds the ECC 422 to the data 421 and outputs the resultant set of the data 421 and the added ECC 422 to the writing unit 211.

When data is to be written, the ECC generating unit 222 receives data to be written from the data processing unit 221. The ECC generating unit 222 then generates a normal ECC from the received data. The ECC generating unit 222 adds the generated normal ECC to the data to be written, and outputs the resultant set of the data to be written and the added normal ECC to the writing unit 211. For example, the ECC generating unit 222 receives data 414 illustrated in FIG. 3A as the data to be written from the data processing unit 221. From the data 414, the ECC generating unit 222 generates "AD8E" as a normal ECC 415. In this case, "0F0F" is generated as the symptom code from the data 414 and the ECC 415. In this case, the generated symptom code 416 is equal to the symptom code 413. As described above, when the data is correct and the ECC is normal, the generated symptom code becomes the same value as "0F0F" in the present example.

Referring to FIG. 3B, when, for example, an ECC 425 having a value "CC1C" is added as the ECC to data 424 having the same value as that of the data 414, a symptom code 422 having the same value as the judgment error code is generated. However, when there is a combination of the data 424 and the ECC 425, a 3RAM error may occur. The probability of a 3RAM error occurring is very low, and thus the probability that the combination of the data 424 and the ECC 425 occurs is substantially zero. Therefore, it is easy to distinguish between a symptom code caused by a normal error and a judgment error code.

The writing unit 211 writes data received from the ECC generating unit 222 into the SDRAM ICs of the rank selected by the selectors 131 to 134. Hereinafter, the writing and reading of data into or from the SDRAM ICs 111 to 114 or the SDRAM ICs 121 to 124 will also be referred to as writing and reading of data to or from the DIMM 1. In the present embodiment, the writing unit 211 writes 72 bits of data into one DIMM 1 at a time. In the present embodiment, for each write command from the data processing unit 221, the writing unit 211 continuously writes data 8 times. That is, the writing unit 211 writes 64 bytes of data in response to a data write command. Note that the amount of data written is not limited to that described above, and the writing unit 211 may write a different amount of data in response to a data write command.

When initializing the primary rank 11, the writing unit 211 receives an initialization command from the data processing unit 221. The writing unit 211 also receives initialization data together with a normal ECC added thereto from the ECC generating unit 222. The writing unit 211 writes the initialization data with the normal ECC added thereto into SDRAM ICs selected by the selectors 131 to 134. In this process, when the rank control unit 213 described later and the selectors 131 to 134 are operating normally, the SDRAM ICs 111 to 114 of the primary rank 11 are selected by the selectors 131 to 134. Thus, when the rank control unit 213 described later and the selectors 131 to 134 are operating normally, the writing unit 211 writes the initialization data with the normal ECC added thereto into the SDRAM ICs 111 to 114 of the primary rank 11.

When initializing the auxiliary rank 12, the writing unit 211 receives an initialization command from the data processing unit 221. The writing unit 211 receives initialization data with an added ECC that generates a judgment error code as a symptom code from the ECC generating unit 222. The writing unit 211 writes the initialization data with the added ECC that generates the judgment error code as the symptom code into the SDRAM ICs selected by the selectors 131 to 134. In this case, when the rank control unit 213 described later and the selectors 131 to 134 are normally operating, the SDRAM ICs 121 to 124 of the auxiliary rank 12 are selected by the selectors 131 to 134. Thus, when the rank control unit 213 described later and the selectors 131 to 134 are normally operating, the writing unit 211 writes the initialization data with the added ECC that generates the judgment error code as the symptom code into the SDRAM ICs 121 to 124 of the auxiliary rank 12.

If a 1-bit error is detected during failure monitoring, the writing unit 211 receives, from the data processing unit 221, a write command to write data to an address at which error-detected data is stored. The writing unit 211 also receives data to be written together with a normal ECC added thereto from the ECC generating unit 222. The writing unit 211 writes the data to be written with the added normal ECC to the specified address of the SDRAM ICs of the rank selected by the selectors 131 to 134.

In the rank exchanging process, the writing unit 211 receives, from the data processing unit 221, a command to write data to the auxiliary rank 12. The writing unit 211 also receives data read from the primary rank 11 together with a normal ECC added thereto from the ECC generating unit 222, and the writing unit 211 writes the data with the added ECC into SDRAM ICs of the rank selected by the selectors 131 to 134. In this case, when the rank control unit 213 described later and the selectors 131 to 134 are normally operating, the SDRAM ICs 121 to 124 of the auxiliary rank 12 are selected by the selectors 131 to 134. Thus, when the rank control unit 213 described later and the selectors 131 to 134 are normally operating, the writing unit 211 writes the data read from the primary rank 11 into the SDRAM ICs 121 to 124 of the auxiliary rank 12.

When data processing, the writing unit 211 receives a data write command from the data processing unit 221. The writing unit 211 also receives data to be written together with a normal ECC added thereto from the ECC generating unit 222. The writing unit 211 writes the data to be written with the added normal ECC into SDRAM ICs of the rank selected by the selectors 131 to 134. Part of the function of the writing unit 211 and the ECC generating unit 222 is an example of an "initialization processor".

The reading unit 212 reads the data specified by the data processing unit 221 from the SDRAM ICs of the rank selected by the selectors 131 to 134. In the present embodiment, the reading unit 212 reads 72 bits of data from one DIMM 1 at a time. Furthermore, in the present embodiment, in response to each read command from the data processing unit 221, the reading unit 212 continuously reads data eight times. That is, the reading unit 212 reads 64 bytes of data in response to each read command. However, the amount of data read as described above is just one example, and the reading unit 212 may read a different amount of data.

When failure monitoring, the reading unit 212 receives a data read command from the data processing unit 221. The reading unit 212 then reads data from SDRAM ICs of the rank selected by the selectors 131 to 134. Here, when the rank control unit 213 and the selectors 131 to 134 are normally operating, the reading unit 212 reads data from the SDRAM ICs of the rank specified by the data processing unit 221. The reading unit 212 outputs the read data to the ECC checking unit 223.

If a 1RAM error is detected during failure monitoring, after the writing unit 211 rewrites the error-detected data, the reading unit 212 receives, from the data processing unit 221, a command to read the data at the address where the error-detected data had been stored. In response, the reading unit 212 reads data from the specified address. The reading unit 212 then outputs the read data to the ECC checking unit 223.

In the rank exchanging process, the reading unit 212 receives, from the data processing unit 221, a command to read data from the primary rank 11. In response, the reading unit 212 reads data from SDRAM ICs of the rank selected by the selectors 131 to 134. In this case, when the rank control unit 213 described later and the selectors 131 to 134 are normally operating, the SDRAM ICs 111 to 114 of the primary rank 11 are selected by the selectors 131 to 134. Thus, when the rank control unit 213 described later and the selectors 131 to 134 are operating normally, the reading unit 212 reads data from the SDRAM ICs 111 to 114 of the primary rank 11.

When data processing, the reading unit 212 receives from the data processing unit 221 a command to read data. The reading unit 212 then reads data specified by the command with an ECC added thereto from SDRAM ICs of the rank selected by the selectors 131 to 134. The reading unit 212 outputs the read data to the ECC checking unit 223.

The ECC checking unit 223 receives the data read by the reading unit 212, and the ECC checking unit 223 generates a symptom code from the data portion of the received data and the ECC. The ECC checking unit 223 then determines based on the symptom code whether the data is correct or there is a 1RAM error or a 2RAM error or an error for more than two SDRAM ICs. The ECC checking unit 223 outputs information described below together with the received data to the data processing unit 221. If the data is correct, the ECC checking unit 223 outputs a normal notification to the data processing unit 221. If there is a 1RAM error, the ECC checking unit 223 transmits a 1RAM-error notification together with the symptom code to the data processing unit 221. If there is a 2RAM error or an error of a greater number of RAMs, the ECC checking unit 223 outputs notification signifying that a 2RAM error or an error for more than two SDRAM ICs has occurred together with the symptom code to the data processing unit 221. The combination of the ECC checking unit 223 and the data processing unit 221 is an example of an error detecting unit.

When initializing the primary rank 11, the rank control unit 213 receives, from the data processing unit 221, a command to select the primary rank 11. The rank control unit 213 then controls the selectors 131 to 134 to select the SDRAM ICs 111 to 114 of the primary rank 11.

When initializing the auxiliary rank 12, the rank control unit 213 receives from the data processing unit 221 an instruction to select the auxiliary rank 12. The rank control unit 213 then controls the selectors 131 to 134 to select the SDRAM ICs 121 to 124 of the auxiliary rank 12.

While failure monitoring, the rank control unit 213 receives from the data processing unit 221 an instruction to select the primary rank 11 or the auxiliary rank according to the flow of the failure monitoring process. In response, the rank control unit 213 controls the selectors 131 to 134 to select the SDRAM ICs 111 to 114 of the primary rank 11 or the SDRAM ICs 121 to 124 of the auxiliary rank 12 according to the instruction from the data processing unit 221.

When the reading unit 212 reads data from the primary rank 11 in the rank exchanging process, the rank control unit 213 receives, from the data processing unit 221, an instruction to select the primary rank 11. In response to this instruction, the rank control unit 213 controls the selectors 131 to 134 to select the SDRAM ICs 111 to 114 of the primary rank 11. If the writing unit 211 writes data into auxiliary rank 12 in the rank exchanging process, the rank control unit 213 receives, from the data processing unit 221, an instruction to select the auxiliary rank 12. In response to this instruction, the rank control unit 213 controls the selectors 131 to 134 to select the SDRAM ICs 121 to 124 of the auxiliary rank 12. Note that a combination of the rank control unit 213 and the selectors 131 to 134 is an example of a "switching unit".

Figure 4:
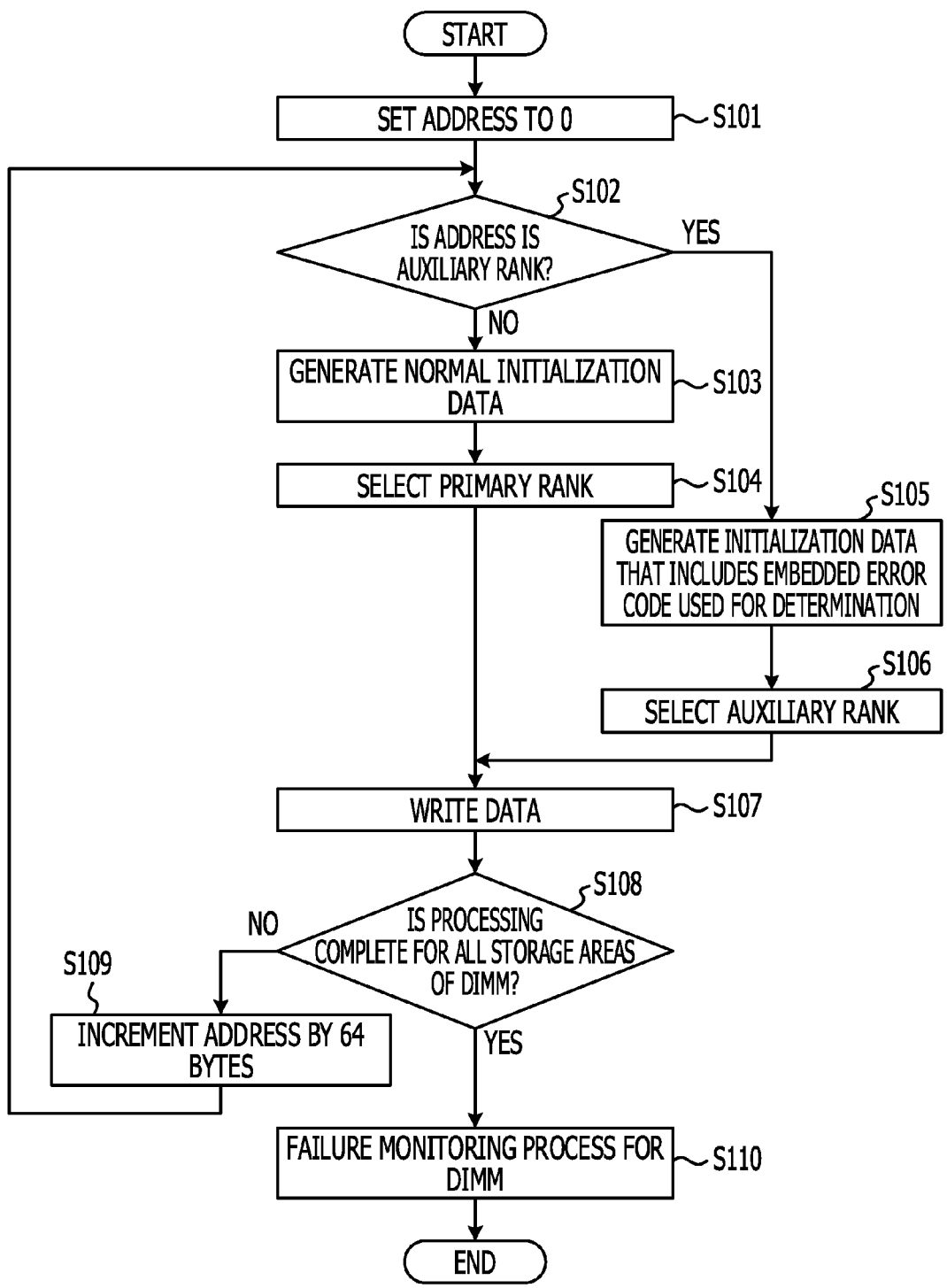
FIG. 4 is a flow chart illustrating a process of initializing a DIMM performed by an information processing apparatus according to an embodiment.

Next, referring to FIG. 4, a description is given below of a processing flow for initialization of a DIMM performed by the information processing apparatus according to the present embodiment. FIG. 4 is a flow chart illustrating the process of initializing the DIMM performed by the information processing apparatus according to the present embodiment. In the following description, it is assumed by way of example that serial numbers starting from 0 are assigned to the primary rank 11 and the auxiliary rank 12.

The data processing unit 221 sets a first address of a storage area to be initialized to 0 (address=0) (step S101). The data processing unit 221 then determines whether the address of the storage area to be initialized belongs to the auxiliary rank 12 (step S102).

If the address of the storage area to be initialized belongs to the primary rank 11 (when the determination in step S102 is negative), the data processing unit 221 instructs the ECC generating unit 222 to generate normal initialization data that includes initialization data and a normal ECC added to the initialization data. The ECC generating unit 222 generates normal initialization data (step S103). The ECC generating unit 222 then outputs the normal initialization data to the writing unit 211. The data processing unit 221 instructs the rank control unit 213 to select the primary rank 11. The rank control unit 213 controls the selectors 131 to 134 to select the primary rank 11 (step S104).

Conversely, if the addresses of the storage area to be initialized are those of the auxiliary rank 12 (when the determination in step S102 is affirmative), the data processing unit 221 instructs the ECC generating unit 222 to generate initialization data that includes an embedded judgment error code. The ECC generating unit 222 generates initialization data that includes an embedded judgment error code (step S105). The ECC generating unit 222 then outputs the initialization data that includes the embedded judgment error code to the writing unit 211. The data processing unit 221 instructs the rank control unit 213 to select the auxiliary rank 12. In response, the rank control unit 213 controls the selectors 131 to 134 to select the auxiliary rank 12 (step S106).

The writing unit 211 writes the data received from the ECC generating unit 222 into SDRAM ICs of the rank selected by the selectors 131 to 134 (step S107).

The data processing unit 221 determines whether initialization is complete for all storage areas of the DIMM 1 (step S108). If initialization is not complete for all storage areas of the DIMM 1 (when the determination in step S108 is negative), The data processing unit 221 sets a value equal to the first address of the current storage area subject to initialization plus 64 bytes as the first address of the next storage area to be initialized (address=address+64 bytes) (step S109). The processing flow then returns to step S102.

Conversely, if the initialization is complete for all storage areas of the DIMM 1 (when the determination in step S108 is affirmative), the data processing unit 221 error checks the DIMM 1 (step S110). The error checking process will be described in detail later. When the error checking is complete, the data processing unit 221 ends the initialization of the DIMM 1.

Figure 5A:
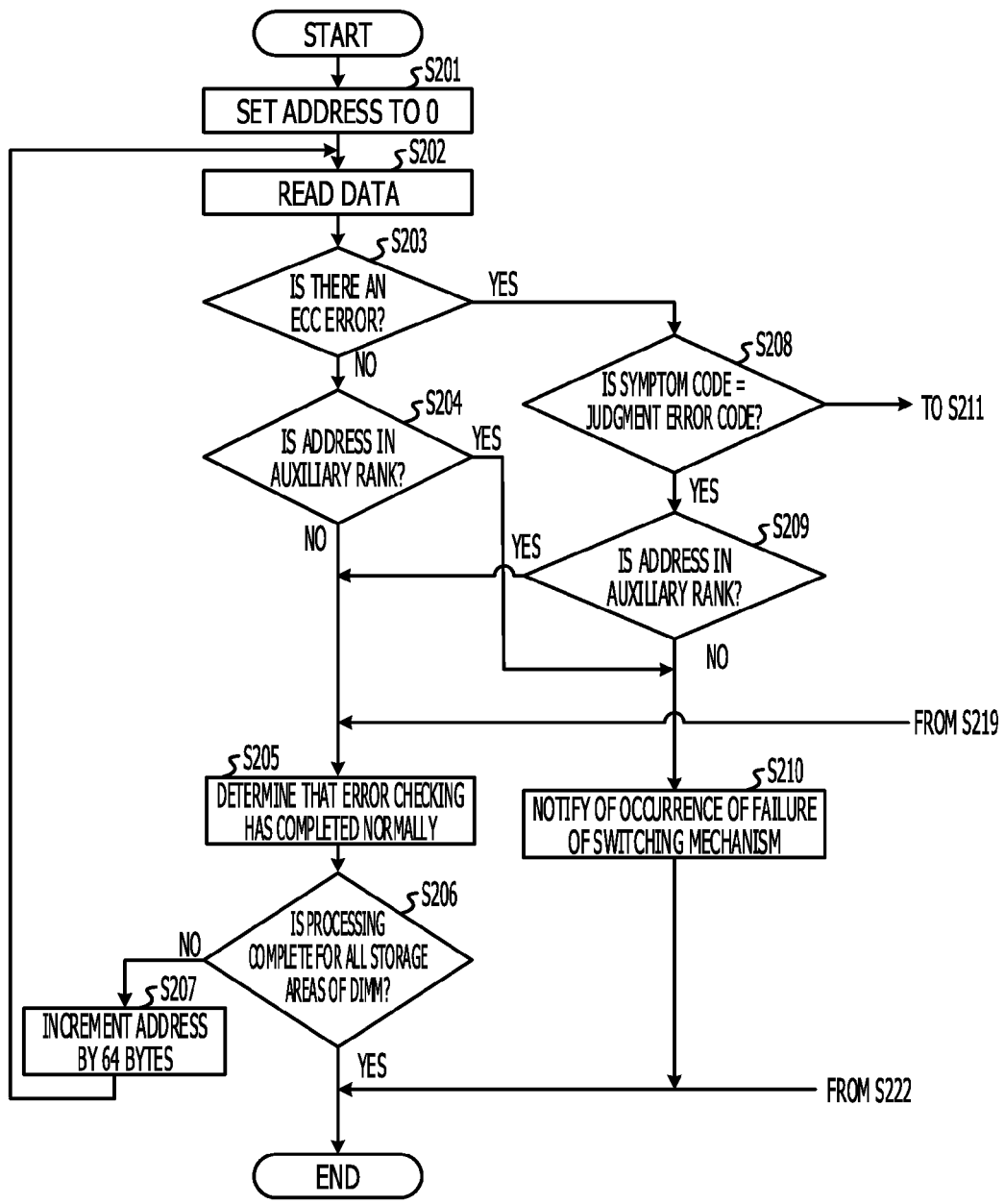
FIGS. 5A and 5B are a flow chart illustrating a process of monitoring a failure of a DIMM.
Figure 5B:
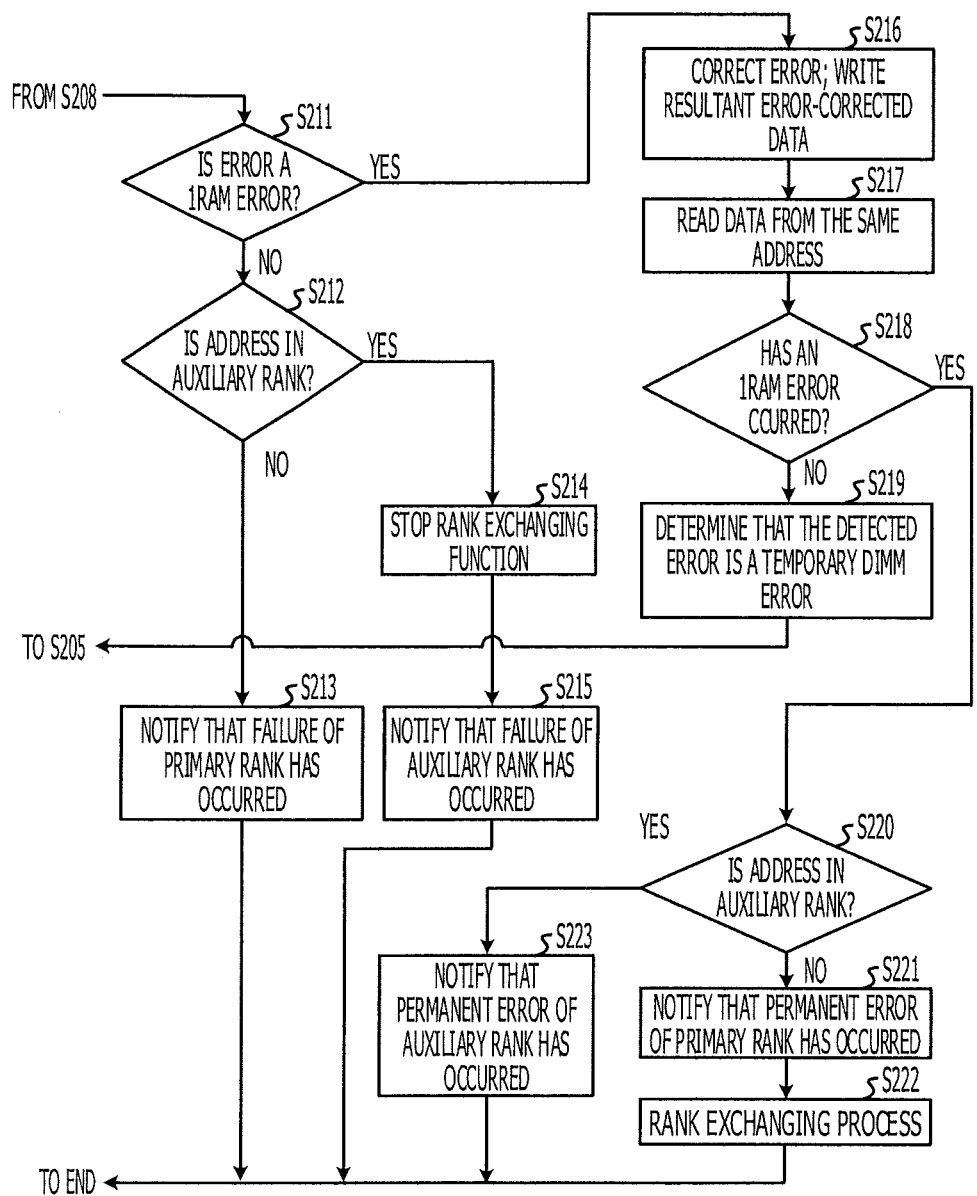

Next, referring to FIGS. 5A and 5B, a description is given below of the flow of a process of monitoring for failure of the DIMM. FIGS. 5A and 5B are a flow chart illustrating the process of monitoring for failure of the DIMM.

The data processing unit 221 sets the value of a first address of a storage area to be failure-checked to 0 (address=0) (step S201). The data processing unit 221 then instructs the reading unit 212 to read data in a range from the first address up to an address equal to the first address plus 64 bytes (that is, 64 bytes are read starting from and inclusive of address 0). In response, the reading unit 212 reads data in the range from the first address to the address equal up to the first address plus 64 bytes (that is 64 bytes are read starting from and inclusive of the first address) (step S202). The reading unit 212 outputs the read data to the ECC checking unit 223.

The ECC checking unit 223 receives an input of data from the reading unit 212, and the ECC checking unit 223 determines whether there is an ECC error (step S203). If there is no ECC error (when the determination in step S203 is negative), the data processing unit 221 determines whether the addresses being checked are of the auxiliary rank 12 (step S204).

If the addresses being checked are of the primary rank 11 (when the determination in step S204 is negative), the data processing unit 221 determines that the check completed normally (step S205). The data processing unit 221 then determines whether checking is complete for all storage areas of the DIMM 1 (step S206). If the checking is not complete for all storage areas of the DIMM 1 (when the determination in step S206 is negative), the data processing unit 221 sets the first address of a next storage area to be checked to a value equal to the first address of the current storage area subjected to checking plus 64 bytes (step S207). The processing flow then returns to step S202.

Conversely, if the checking is complete for all storage areas of the DIMM 1 (when the determination in step S206 is affirmative), the data processing unit 221 ends the failure monitoring of the DIMM 1.

Conversely, if the addresses being checked are of the auxiliary rank 12 (when the determination in step S204 is affirmative), the data processing unit 221 notifies an operator that a failure of the rank exchanging process has occurred (step S210), and the data processing unit 221 stops failure monitoring.

If an ECC error is detected (when the determination in step S203 is affirmative), the data processing unit 221 determines whether the symptom code received from the ECC checking unit 223 matches a judgment error code (step S208).

If the symptom code matches the judgment error code (when the determination in step S208 is affirmative), the data processing unit 221 determines whether the rank to which the addresses being checked has been assigned is of the auxiliary rank 12 (step S209). If the addresses being checked are of the auxiliary rank 12 (when the determination in step S209 is affirmative), it means that the symptom code is as expected and thus the data processing unit 221 advances the processing flow to step S205 and determines that the status of the check is normal.

Conversely, if the addresses being checked are of the primary rank 11 (when the determination in step S209 is negative), it means that data is not being read from the intended primary rank 11 but is incorrectly being read from the auxiliary rank 12, and thus the data processing unit 221 notifies an operator that the switching mechanism has failed (step S210), and the data processing unit 221 ends the failure monitoring process.

If the symptom code is a code other than a judgment error code (when the determination in step S208 is negative), the data processing unit 221 further determines whether the detected error is a 1RAM error (step S211). If the detected error is of a 2RAM error or an error for more than two SDRAM ICs, (when the determination in step S211 is negative), the data processing unit 221 determines whether the rank, to which the addresses being checked have been assigned, is the auxiliary rank 12 (step S212). If the addresses being checked are of the primary rank 11 (when the determination in step S212 is negative), the data processing unit 221 notifies an operator that a failure in the primary rank 11 has occurred (step S213), and the data processing unit 221 ends the failure monitoring process.

If the addresses being checked are of the auxiliary rank 12 (when the determination in step S212 is affirmative), it means that there is a failure in the auxiliary rank 12, and thus the data processing unit 221 instructs the rank control unit 213 to disable the rank exchanging function. In response, the rank control unit 213 disables the rank exchanging function (step S214). Furthermore, the data processing unit 221 notifies an operator that a failure in the auxiliary rank 12 has occurred (step S215), and the data processing unit 221 ends the failure monitoring process.

If the detected error is a 1RAM error (when the determination in step S211 is affirmative), the data processing unit 221 corrects the error of the data of the SDRAM IC in which the error was detected. The data processing unit 221 then instructs the writing unit 211 to write the corrected data into the SDRAM IC in which the error has been detected. The writing unit 211 receives the error-corrected data and a normal ECC added thereto from the ECC generating unit 222, and writes the received data into the SDRAM IC in which the error was detected (step S216).

In response to an instruction from the data processing unit 221, the reading unit 212 reads data from the same address from which the error-detected data was read (step S217).

The ECC checking unit 223 determines whether the data read by the reading unit 212 has a 1RAM error (step S218). If a 1RAM error is not detected (when the determination in step S218 is negative), the data processing unit 221 determines that the error was a temporary failure of the DIMM 1 (step S219). The data processing unit 221 advances the process to step S205 and determines that the checking completed normally.

Conversely, if a 1RAM error occurs again (when the determination in step S218 is affirmative), the data processing unit 221 determines whether the rank, to which the addresses being checked is assigned, is the auxiliary rank 12 (step S220). If the addresses being checked are of the primary rank 11 (when the determination in step S220 is negative), the data processing unit 221 notifies an operator that a failure in the primary rank 11 has occurred (step S221). The data processing unit 221 then performs a rank exchanging process (step S222). The rank exchanging process will be described in detail later. Thereafter, the data processing unit 221 ends the failure monitoring process.

Conversely, if the addresses being checked are of the auxiliary rank 12 (when the determination in step S220 is affirmative), the data processing unit 221 notifies an operator that a permanent error in the auxiliary rank 12 has occurred (step S223), and the data processing unit 221 ends the failure monitoring process.

Figure 6:
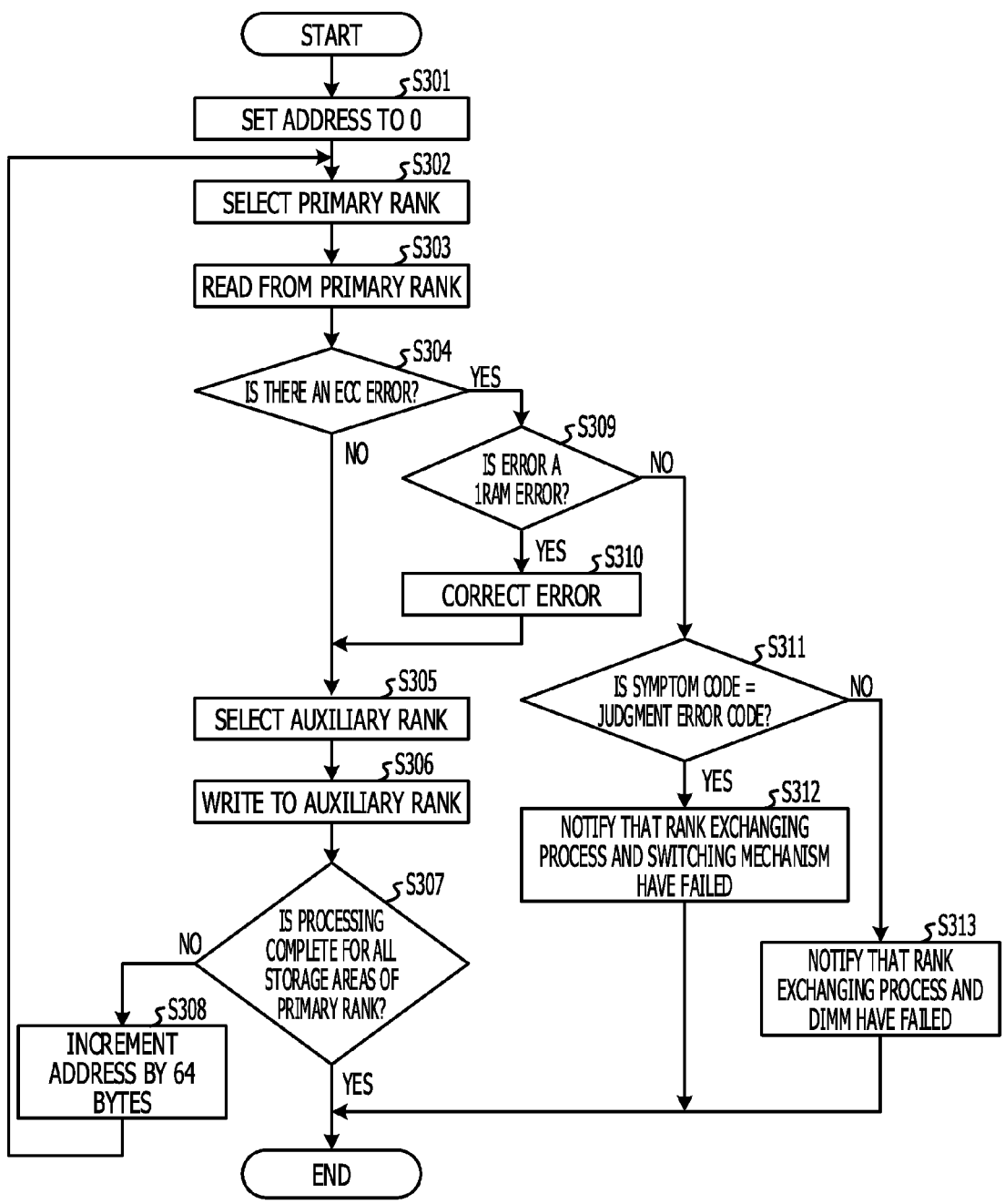
FIG. 6 is a flow chart illustrating a rank exchanging process.

Next, referring to FIG. 6, a description is given below of the flow of a rank exchanging process. FIG. 6 is a flow chart illustrating a rank exchanging process.

The data processing unit 221 sets a first address of a storage area that is to be error-checked to 0 (address=0) (step S301).

The data processing unit 221 instructs the rank control unit 213 to select the primary rank 11. In response, the rank control unit 213 controls the selectors 131 to 134 to select the primary rank 11 (step S302).

The data processing unit 221 instructs the reading unit 212 to read data in a range from the first address up to before an address equal to the first address plus 64 bytes. In response, the reading unit 212 reads 64 bytes of data from the specified first address the primary rank 11 (step S303). In response, the reading unit 212 outputs the read data to the ECC checking unit 223.

The ECC checking unit 223 is input with data from the reading unit 212, and the ECC checking unit 223 determines whether there is an ECC error (step S304). If there is no ECC error (when the determination in step S304 is negative), the data processing unit 221 instructs the rank control unit 213 to select the auxiliary rank 12. In response, the rank control unit 213 controls the selectors 131 to 134 to select the auxiliary rank 12 (step S305).

The data processing unit 221 instructs the writing unit 211 to write the data read from the primary rank 11. The writing unit 211 receives the data read from the primary rank 11 together with a normal ECC added thereto from the ECC generating unit 222, and the writing unit 211 writes the received data into the SDRAM ICs 121 to 124 of the auxiliary rank 12 (step S306). However, if a failure occurs in the operation of the rank control unit 213 or the selectors 131 to 134, there is a possibility that the writing unit 211 may write the received data incorrectly into the primary rank 11.

The data processing unit 221 determines whether moving of data from the primary rank 11 to the auxiliary rank 12 is completed for all data of the primary rank 11 (step S307). If the moving is not completed for all data of the primary rank 11 (when the determination in step S307 is negative), the data processing unit 221 increments a first address of a next storage area to be moved to a by 64 bytes (step S308). The processing flow then returns to step S302.

If the moving is complete for all data, (when the determination in step S307 is affirmative), the data processing unit 221 ends the rank exchanging process.

If an ECC error is detected (when the determination in step S304 is affirmative), the data processing unit 221 determines whether the detected error is a 1RAM error (step S309). If the detected error is a 1RAM error (when the determination in step S309 is affirmative), the data processing unit 221 corrects the error of the data of the SDRAM IC in which the error is detected (step S310). Thereafter, the processing flow proceeds to step S305.

If the detected error is an error of 2RAM or an error for more than two SDRAM ICs (when the determination in step S309 is negative), the data processing unit 221 determines whether the symptom code received from the ECC checking unit 223 matches the judgment error code (step S311).

If the symptom code matches the judgment error code (when the determination in step S311 is affirmative), the data processing unit 221 determines that the data is that read from the auxiliary rank 12. Thus, the data processing unit 221 notifies an operator that a failure in the rank switching mechanism and a failure of the rank exchanging process have occurred (step S312), and the data processing unit 221 ends the rank exchanging process. As described above, the information processing apparatus according to the present embodiment is capable of detecting a failure even if the failure occurs in the rank control unit 213 or the selectors 131 to 134 during the rank exchanging process.

If the symptom code is not equal to the judgment error code (when the determination in step S311 is negative), the data processing unit 221 determines that a failure has occurred in the primary rank 11, and thus the data processing unit 221 notifies an operator that an error in the DIMM 1 and failure of the rank exchanging process have occurred (step S313), and the data processing unit 221 ends the rank exchanging process. As described above, the information processing apparatus according to the present embodiment is capable of detecting a failure even if a failure occurs in the primary rank 11 during the rank exchanging process.

Figure 7:
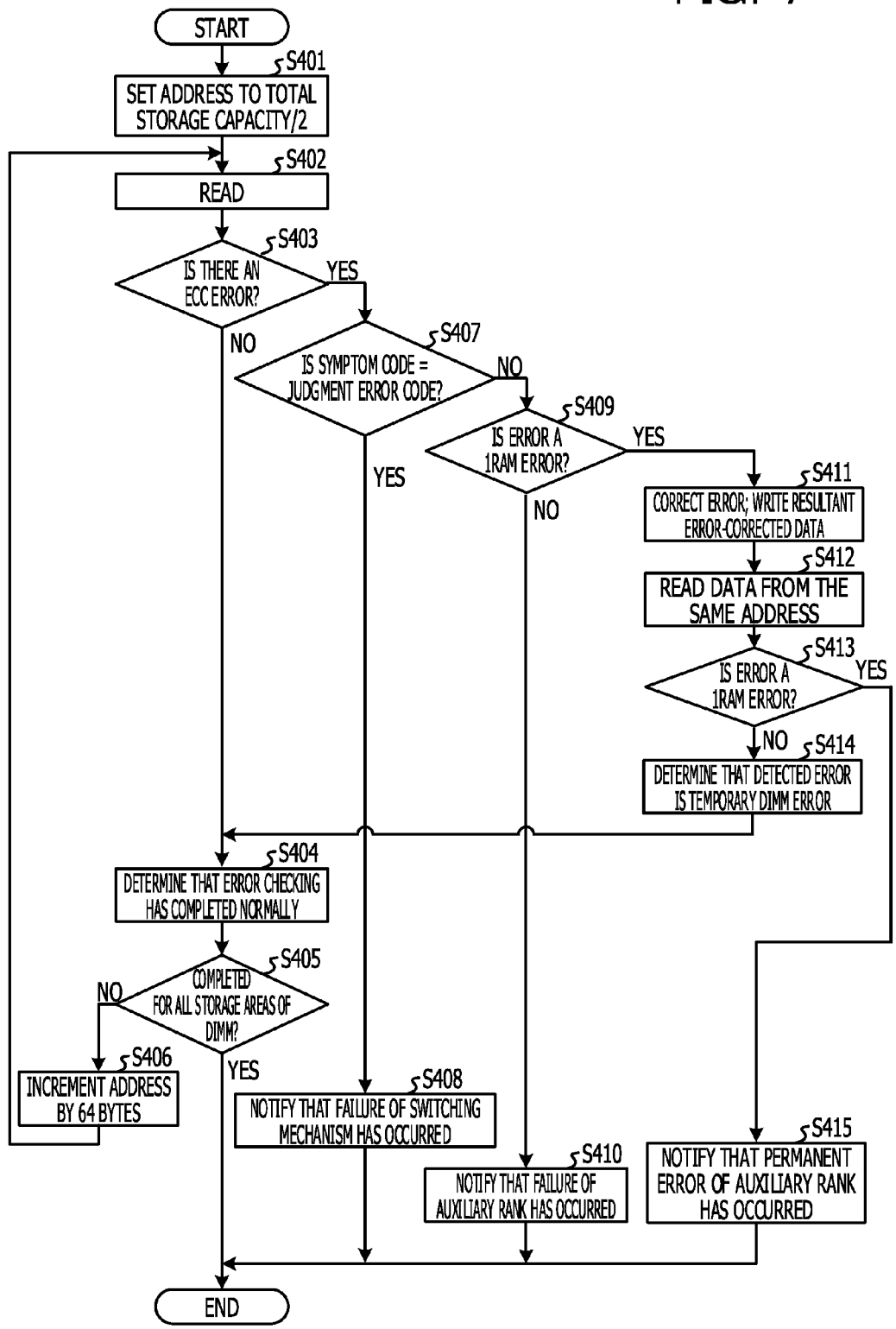
FIG. 7 is a flow chart illustrating a process of monitoring a failure of a DIMM after a rank exchanging process has been performed.

Next, referring to FIG. 7, description is given below of a flow of a process of monitoring a failure of the DIMM 1 after the rank exchanging process is performed. FIG. 7 is a flow chart illustrating the process of monitoring a failure of the DIMM 1 after the rank exchanging process is performed.

The data processing unit 221 sets a first address of a storage area to be failure-checked to be equal to one-half the total storage capacity of the DIMM 1 (address=total storage capacity/2) (step S401). The data processing unit 221 then instructs the reading unit 212 to read 64 bytes of data starting from the first address. In response, the reading unit 212 reads 64 bytes of data starting from the first address (step S402), and the reading unit 212 outputs the read data to the ECC checking unit 223.

The ECC checking unit 223 is input with data from the reading unit 212, and the ECC checking unit 223 determines whether there is an ECC error (step S403). If there is no ECC error (when the determination in step S403 is negative), the data processing unit 221 determines that the checking completed normally (step S404).

The data processing unit 221 then determines whether the error checking is complete for all storage areas of the auxiliary rank 12 (step S405). If error checking is not complete for all storage areas of the auxiliary rank 12 (when the determination in step S405 is negative), the data processing unit 221 increments the first address of the next storage area to be checked by 64 bytes (address=address+64 bytes) (step S406). The processing flow then returns to step S402.

If error checking is complete for all storage areas of the auxiliary rank 12 (when the determination in step S405 is affirmative), the data processing unit 221 ends the failure monitoring process on the DIMM 1.

If an ECC error is detected (when the determination in step S403 is affirmative), the data processing unit 221 determines whether the symptom code received from the ECC checking unit 223 matches the judgment error code (step S407).

If the symptom code matches the judgment error code (when the determination in step S407 is affirmative), the data processing unit 221 determines that a failure has occurred in writing data into the auxiliary rank 12 during the rank exchanging process. Thus, the data processing unit 221 notifies an operator that a failure in the switching mechanism has occurred (step S408), and the data processing unit 221 ends the failure monitoring process.

Conversely, if the symptom code is a code other than the judgment error code (when the determination in step S407 is negative), the data processing unit 221 determines whether the error is a 1RAM error (step S409). If the error is a 2RAM error or for more than two SDRAM ICs (when the determination in step S409 is negative), the data processing unit 221 notifies an operator that a failure in the auxiliary rank 12 has occurred (step S410), and the data processing unit 221 ends the failure monitoring process.

Conversely, if the error is of 1RAM (when the determination in step S409 is affirmative), the data processing unit 221 corrects the error of the data of the SDRAM IC in which the error is detected. The data processing unit 221 then instructs the writing unit 211 to write the corrected data into the SDRAM IC in which the error is detected. The writing unit 211 receives the error-corrected data together with a normal ECC added thereto from the ECC generating unit 222, and writes the received data into the SDRAM in which the error is detected (step S411).

In response to an instruction from the data processing unit 221, the reading unit 212 reads data from the same address from which the error-detected data was read (step S412).

The ECC checking unit 223 determines whether the data read by the reading unit 212 has a 1RAM error (step S413). If a 1RAM error is not detected (when the determination in step S413 is negative), the data processing unit 221 determines that the error was a temporary failure of the DIMM 1 (step S414). The data processing unit 221 then advances the process to step S404 and determines that the checking completed normally.

Conversely, if a 1RAM error occurs again (when the determination in step S413 is affirmative), the data processing unit 221 notifies an operator that a permanent error in the auxiliary rank 12 has occurred (step S415), and the data processing unit 221 ends the failure monitoring process.

Next, referring to FIG. 8, a summary is given below as to identification of a failure based on an ECC error by the information processing apparatus according to the present embodiment. FIG. 8 is a diagram summarizing failures which may be identified by ECC errors by means of an information processing apparatus according to an embodiment.

If a 1RAM error is detected in a state in which the primary rank 11 is being accessed before the rank exchanging is performed, the symptom code generated indicates a 1RAM error. In this case, the location of the failure is in the DIMM 1, and more specifically, the location of the failure is in the primary rank 11. Therefore, an ECC error for this case indicates an ordinary 1RAM error as described in a box 501. The error described in the box 501, which occurs when the primary rank 11 is being accessed, is the error that is notified to an operator in step S221 in FIG. 5B.

If a 1RAM error is detected in a state in which the auxiliary rank 12 is being accessed before the rank exchanging process is performed, the symptom code generated indicates a 1RAM error. In this case, the location of the failure is in the DIMM 1, and more specifically, the location of the failure is in the auxiliary rank 12. Therefore, the ECC error in this case is, as illustrated in a box 501, an ordinary 1RAM error that is correctable. The error described in the box 501, which occurs when the auxiliary rank 12 is being accessed, is the error that is notified to an operator in step S223 in FIG. 5B.

Next, a discussion is given below for when an error of 2RAM or an error of more than two SDRAM ICs is detected in a state in which the primary rank 11 is being accessed before the rank exchanging is performed. In this case, if the symptom code matches the judgment error code, the location of the failure is in the switching mechanism such as the rank control unit 213 or the selectors 131 to 134. In this case, an ECC error indicates that a switching circuit has a failure as illustrated in a box 502. The error illustrated in the box 502 is an error that is notified to an operator in step S210 in FIG. 5A or step S312 in FIG. 6.

If the symptom code is an error code that is different from the judgment error code and indicates an error of 2RAM or an error for more than two SDRAM ICs, the location of the failure is in the DIMM 1, and more specifically, the location of the failure is in the primary rank 11. In this case, an ECC error is, as illustrated in a box 503, an ordinary error of 2RAM or an error for more than two SDRAM ICs. The error illustrated in the box 503 is an error that is notified to an operator in step S213 in FIG. 5B or step S313 in FIG. 6.

Next, a discussion is given below for when an error of 2RAM or an error of a greater number of RAMs is detected in a state in which the auxiliary rank 12 is being accessed before the rank exchanging is performed. In this case, if the symptom code matches the judgment error code, there is no failure. In this case, an ECC error is, as illustrated in a box 504, an expected error that may occur in a normal state. The error illustrated in the box 504 is the error handled such that the error checking is normally ended in transition from step S209 to step S205 in FIG. 5A.

If the symptom code is an error code that is different from the judgment error code and indicates an error of 2RAM or an error for more than two SDRAM ICs, the location of the failure is in the DIMM 1, and more specifically, the location of the failure is in the auxiliary rank 12. In this case, an ECC error is, as illustrated in a box 505, an ordinary error of 2RAM or an error for more than two SDRAM ICs. The error illustrated in the box 505 is the error that is notified to an operator in step S215 in FIG. 5B.

If a 1RAM error is detected in a state in which the auxiliary rank 12 is being accessed after the rank exchanging is performed, the symptom code generated indicates a 1RAM error. In this case, the location of the failure is in the DIMM 1, and more specifically, the location of the failure is in the auxiliary rank 12. In this case, an ECC error is, as illustrated in a box 506, an ordinary 1RAM error that is correctable. The error illustrated in the box 506 is an error that is notified to an operator in step S415 in FIG. 7.

Next, a discussion is given below for a case where an error of 2RAM or an error for more than two SDRAM ICs is detected in a state in which the auxiliary rank 12 is being accessed after the rank exchanging is performed. In this case, if the symptom code matches the judgment error code, it means that a failure has occurred in writing data into the auxiliary rank 12 in the rank exchanging process. That is, the location of the failure is in the switching mechanism. In this case, an ECC error indicates that a failure has occurred in the rank exchanging process as illustrated in a box 507. The error illustrated in the box 507 is the error that is notified to an operator in step S408 in FIG. 7.

If the symptom code is an error code that is different from the judgment error code and indicates an error of 2RAM or an error for more than two SDRAM ICs, the location of the failure is in the DIMM 1, and more specifically, the location of the failure is in the auxiliary rank 12. In this case, an ECC error is, as illustrated in a box 508, an ordinary error of 2RAM or an error for more than two SDRAM ICs. The error illustrated in the box 508 is the error that is notified to an operator in step S410 in FIG. 7.

As described above, the information processing apparatus according to the embodiment is capable of detecting a failure of the switching mechanism or a failure of the rank exchanging process before or during the rank exchanging process based on whether a judgment error code is generated in the ECC checking. This makes it possible to detect, in advance, a failure of the switching mechanism that performs the rank exchanging process, which makes it possible to avoid a significant problem which otherwise might be occur due to the failure of the switching mechanism. Furthermore, after the rank exchanging process is performed, it is possible to detect a failure of the switching mechanism or a failure of the rank exchanging process based on whether a judgment error code is generated in the ECC checking process. This makes it possible to detect a failure in the switching mechanism or a failure of the rank exchanging process in a more reliable manner than is possible by conventional techniques. The capability of detecting a failure of the switching mechanism and a failure of the rank exchanging process makes it possible to easily determine whether an error occurs in the DIMM or an LSI when the error occurs.

In a technique in which accessing the auxiliary rank is disabled by, for example, stopping a clock to the auxiliary rank thereby avoiding an error in the operation of the switching mechanism, there is a possibility that when the auxiliary rank has a failure, the failure is not detected until the auxiliary rank is used. In this case, there is a possibility that the rank exchanging is not performed and the operation may be continued using the collapsed primary rank. Besides, to start the auxiliary rank, part of the DIMM initialization sequence is performed again, which takes an extra time. In contrast, in the information processing apparatus according to the present embodiment, the auxiliary rank is also operated and the failure monitoring associated with the auxiliary rank is performed periodically, and thus, when the auxiliary rank has a failure, it is possible to detect the failure of the auxiliary rank before the exchanging process is performed. Furthermore, in the rank exchanging process, it becomes possible to skip the sequence of initializing the DIMM, which allows the rank exchanging process to be performed in a shorter time.

In the embodiments described above, it is assumed by way of example that the electronic apparatus is an information processing apparatus serving as a server expected to provide high availability, and it is assumed that an ECC is configured to be capable of correcting an error of one SDRAM IC. However, the ECC is not limited to that described above. For example, in a personal computer or the like, it is common to use an ECC that allows an error correction for each bit. Even in this case, the above-described functions and the effects according to the embodiments are achieved, although units of ECC error correction are changed from RAMs to bits.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
   a first memory;
   a second memory;
   a processor configured to perform an initialization process to initialize the first memory, the initialization process including adding data that generates a first error to initialization data and storing the initialization data together with the added data in the first memory; and
   a controller configured to perform an exchanging process including, when a second error occurs in the second memory during reading or writing data from or to the second memory, copying the data stored in the second memory into the first memory and switching, using a selector, a memory for use in writing and reading data from the second memory to the first memory,
   wherein the processor is configured to perform an error detecting process including reading data from the first memory and the second memory and detecting a failure of the selector or a failure of the exchanging process depending on whether the first error occurs or not.

2. The apparatus according to claim 1, wherein the first memory and the second memory are capable of independently reading and writing data.

3. The apparatus according to claim 1, wherein the first memory and the second memory are disposed in a single memory module.

4. The apparatus according to claim 1, wherein the error detecting process detects the failure of the selector when the first error occurs in the data read from the second memory before the exchanging process is performed.

5. The apparatus according to claim 1, wherein the error detecting process detects the failure of the exchanging process when the first error occurs in the data read from the first memory after the exchanging process is performed.

6. The apparatus according to claim 1, wherein the controller is configured to:
   write data with error detection data added thereto into the first memory and the second memory; and
   read the data with the added error detection data from the first memory and the second memory,
   wherein the initialization process includes initializing the first memory by adding data from the error detection data that generates the first error to the initialization data and storing the resultant initialization data into the first memory,
   the error detecting process includes detecting whether the second error occurs in the read data and detecting an error type based on the error detection data, and
   the exchanging process includes, when an occurrence of the second error is detected, switching a memory for use in writing and reading data from the second memory to the first memory.

7. The apparatus according to claim 1, wherein the initialization process includes adding, to the initialization data, data that generates an error as the first error at two or more positions in the initialization data.

8. A method of controlling an apparatus, the method comprising:
   initializing a first memory by adding data that generates a first error to initialization data and storing the resultant initialization data into the first memory;
   when a second error occurs in a second memory during reading and writing data from or to the second memory, performing an exchanging process including copying data stored in the second memory into the first memory and switching the memory for use in writing and reading data from the second memory to the first memory, and
   performing an error detecting process including reading data from the first memory and the second memory, and detecting a failure of a selector that performs the exchanging process or a failure of the exchanging process depending on whether the first error occurs.

9. The method according to claim 8, wherein the first memory and the second memory are capable of independently reading and writing data.

10. The method according to claim 8, wherein the first memory and the second memory are disposed in a single memory module.

11. The method according to claim 8, the error detecting process detects the failure of the selector when the first error occurs in the data read from the second memory before the exchanging process is performed.

12. The method according to claim 8, wherein the error detecting process detects the failure of the exchanging process when the first error occurs in the data read from the first memory after the exchanging process is performed.

13. The method according to claim 8, further comprising:
   writing data with error detection data added thereto into the first memory and the second memory; and
   reading the data with the added error detection data from the first memory and the second memory,
   wherein the initialization process includes initializing the first memory by adding data from the error detection data that generates the first error to the initialization data and storing the resultant initialization data into the first memory,
   the error detecting process includes detecting whether the second error occurs in the read data and detecting an error type based on the error detection data, and
   the exchanging process includes, when an occurrence of the second error is detected, switching a memory for use in writing and reading data from the second memory to the first memory.

14. The method according to claim 8, wherein the initialization process includes adding, to the initialization data, data that generates an error as the first error at two or more positions in the initialization data.

* * * * *